US012186950B2

(12) United States Patent
Rella et al.

(10) Patent No.: US 12,186,950 B2
(45) Date of Patent: Jan. 7, 2025

(54) METHOD FOR VIEWING AND SELECTING PRODUCTION RESOURCES, IN PARTICULAR PERIPHERAL DEVICES, FOR THE INJECTION MOLDING INDUSTRY, AND AN INDUSTRIAL INSTALLATION

(71) Applicant: WITTMANN TECHNOLOGY GMBH, Vienna (AT)

(72) Inventors: Johannes Rella, Payerbach (AT); Peter Michael Wittmann, Leobendorf (AT)

(73) Assignee: WITTMANN TECHNOLOGY GMBH, Vienna (AT)

( * ) Notice: Subject to any disclaimer, the term of this patent is extended or adjusted under 35 U.S.C. 154(b) by 958 days.

(21) Appl. No.: 16/759,052

(22) PCT Filed: Oct. 17, 2018

(86) PCT No.: PCT/AT2018/060245
§ 371 (c)(1),
(2) Date: Oct. 25, 2021

(87) PCT Pub. No.: WO2019/079835
PCT Pub. Date: May 2, 2019

(65) Prior Publication Data
US 2022/0080634 A1    Mar. 17, 2022

(30) Foreign Application Priority Data
Oct. 29, 2017  (AT) ............... A 50902/2017

(51) Int. Cl.
*B29C 45/17*     (2006.01)
*B29C 45/76*     (2006.01)
*G06Q 10/0631*   (2023.01)

(52) U.S. Cl.
CPC .......... *B29C 45/176* (2013.01); *B29C 45/766* (2013.01); *G06Q 10/06312* (2013.01);
(Continued)

(58) Field of Classification Search
CPC ........................ B29C 45/176; B29C 45/766
(Continued)

(56) References Cited

U.S. PATENT DOCUMENTS 7,181,311 B2   2/2007  Dashs et al.
8,316,297 B2   11/2012 Grimm et al.
(Continued)

FOREIGN PATENT DOCUMENTS

DE  102004004695   8/2005
DE  102005014941   10/2006
(Continued)

OTHER PUBLICATIONS

Int'l Search Report (Forms PCT/ISA/210) conducted in Int'l Appln. No. PCT/AT2018/060245 (Jan. 31, 2019).
(Continued)

*Primary Examiner* — Allyson N Trail
(74) *Attorney, Agent, or Firm* — GREENBLUM & BERNSTEIN, P.L.C.

(57) ABSTRACT

Method for viewing and selecting production resources, in particular peripheral devices, for the injection molding industry, which are organized in at least one work cell for producing an injection-molded part and connected to one another via a network. Following a manual storage request on a control device, in particular a work cell controller, or on a production resource, in particular a processing machine, all connected production resources are queried and defined data, such as the respective settings, as well as program sequences, formulations and other configurations, are read out from these and, together with the internal settings, in particular those of the processing machine, combined to form a mold data record for this injection-molded part. A listing of production resources for the injection-molded part producible on this processing machine can be automatically (Continued)

generated from the mold data record and displayed at an output location, preferably of the processing machine.

13 Claims, 3 Drawing Sheets (52) U.S. Cl.
CPC ............... *B29C 2045/1796* (2013.01); *B29C 2945/76792* (2013.01); *B29C 2945/76993* (2013.01)

(58) Field of Classification Search
USPC .......................................................... 235/375
See application file for complete search history.

(56) References Cited

U.S. PATENT DOCUMENTS

| 11,308,298 | B2* | 4/2022 | O'Brien | ............... B29C 33/70 |
| 2006/0082010 | A1 | 4/2006 | Saggese et al. | |
| 2008/0279974 | A1 | 11/2008 | Saggese et al. | |
| 2010/0031013 | A1* | 2/2010 | Chang | ............... B29C 45/766 |
| | | | | 713/100 |
| 2016/0203232 | A1 | 7/2016 | O'Brien et al. | |
| 2016/0375701 | A1 | 12/2016 | Osterday et al. | |
| 2018/0345557 | A1* | 12/2018 | Kang | ............... B29C 45/4225 |
| 2019/0070763 | A1* | 3/2019 | Altonen | ............... B29C 45/78 |
| 2020/0001511 | A1* | 1/2020 | Burns | ............... B29C 45/7693 |
| 2020/0307053 | A1* | 10/2020 | Shimada | ............... B29C 45/766 |
| 2023/0347564 | A1* | 11/2023 | Wollny | ............... B29C 45/7693 |

FOREIGN PATENT DOCUMENTS

| DE | 102009007559 | 8/2010 |
| DE | 202011102621 | 2/2011 |
| WO | 2004/076143 | 9/2004 |

OTHER PUBLICATIONS

Int'l Written Opinion (Form PCT/ISA/237) conducted in Int'l Appln. No. PCT/AT2018/060245 (Jan. 31, 2019).

* cited by examiner

METHOD FOR VIEWING AND SELECTING PRODUCTION RESOURCES, IN PARTICULAR PERIPHERAL DEVICES, FOR THE INJECTION MOLDING INDUSTRY, AND AN INDUSTRIAL INSTALLATION

The present invention relates to a method for viewing and selecting production resources, in particular peripheral devices, for the injection molding industry, as well as an industrial installation as described in the generic terms of claims 1 and 12.

Processes and methods for networking industrial installations for generation of an injection-molded part in which the individual production resources, such as an injection molding machine, a temperature control unit, a granule dryer, etc. are networked are per se known from the art. Here, the individual devices are connected to a network by a network specialist, where the network specialist makes the necessary settings on these devices, in particular assigning a corresponding address. Subsequently, it is necessary that a further expert determines and establishes the process parameters and production resources, in particular peripheral devices, required for the production of an injection-molded part in the course of a mold acceptance test.

After a tooling change has been carried out, it is once more necessary to reassemble the industrial installation in accordance with the findings of the preceding mold acceptance test, whereby the user or machine setter, respectively, uses appropriate paper documents in the form of worksheets or mold data sheets, respectively, for this purpose. However, this very often results in incorrect settings or incorrectly combined production resources, usually resulting in rejects among the injection-molded parts or, in the worst case, damage to the industrial installation.

Currently, the mold data sheet provides the machine setter with a collection of important information for the correct assembly and adjustment of injection-molding work cells. As the production resources are very varied, the only way is to manually create this mold data sheet and, if a tool is to be reused, to print it out manually, after which the machine setter makes the appropriate settings on site, wherein mix-ups, incorrect setting, or overlooking of settings, etc., are very frequent.

From DE 102005014941 A1, a method for providing documentation information is known. Here, the individual documentation elements for the individual components are queried from the individual components directly or via a network, in particular the internet, and bundled into a single overall document. By opening this overall document, the user is thus able to peruse all the operating instructions and data sheets for the components used, and no longer has to read the data directly from the corresponding components.

Furthermore, WO 2004/076143 A2 discloses a global control software that stores component-specific parameters of components in a separate storage device. This makes it possible to reload these parameters during start-up.

DE 102004004695 A1 in turn discloses a method and system for compiling plant documentation.

Furthermore, DE 102009007559 A1 discloses a drive system with a control unit and at least two components connected to it, wherein corresponding detection data are stored.

The objective of the present invention is therefore to provide a method and an industrial installation of the type mentioned above, whereby the above-mentioned disadvantages are avoided and at the same time a simplification for maintenance and repair work and a tooling change is created.

The objective is achieved by the invention.

The method according to the present invention for viewing and selecting production resources is characterized in that, after a manual storage request at a control device, in particular a work cell controller, or at a production resource, in particular a processing machine, all connected production resources are queried, and data defined, such as the respective settings, as well as program sequences, formulations and other configurations, are read out from these and, together with the internal settings, in particular those of the processing machine, combined to form a mold data record for this injection-molded part, whereby a listing of the necessary production resources for an injection-molded part that can be produced on this processing machine can be automatically generated at any time from the mold data record and displayed at an output location, preferably the processing machine.

The advantage here is that necessary data are collected at a central location, preferably a processing device, in particular an injection molding machine, from the connected production resources and processed into one or several mold data records that can be easily retrieved. Another major advantage is that the automatic independent detection of newly added or removed devices, in particular production resources, and the list or work cell directory, respectively, created from the same makes administration and integration easy. The logical allocation of production resources to the work cell is automatically derived from the composition of the respective list. This list or work cell directory, respectively, is either generated from the mold data record as required, or can be a part of the mold data record upon data backup and be, like the mold data record, stored internally on the machine control or in an MES/ERP system whence it is easily retrievable.

However, advantageous measures are also such where, after performance of a tool change on the processing machine, the associated mold data record is transmitted to the processing machine via an external MES or ERP system or is taken from the internal tool catalog or settings of the processing machine, respectively, and the mold data record is automatically distributed by the processing machine or a work cell controller to the corresponding components of the connected and necessary production resources and transferred to the same. This ensures that each production resource is automatically assigned its settings from the mold data record. This prevents a machine setter from having to select from a large number of different parameter sets the appropriate one for this tool, potentially leading to mix-ups. This eliminates the selection and thus the most frequent source of error, namely mix-up or selection, respectively, of the wrong parameter set, settings, formulations, programs, etc. It is furthermore possible that all mold data records of a work cell are collectively retrievable at a processing device or work cell controller, so that the machine setter can obtain an overview of the system or work cell, respectively, from this main station and prepare the necessary production resources for an imminent tooling change.

Advantageous measures are such where as mold data records, in addition to the machine-internal process parameters of the processing machine for e.g. plasticizing, melt entry, and mold closure, the respective settings, parameters, identifiers of the various production resources for mold temperature control, cooling, material drying, metering and conveying, as well as workflow programs for automatic demolding of the respective injection-molded part by robots, gripper identifiers, as well as parameters for external process aids and other part-specific data can be stored. This ensures that all the necessary data are available digitally in the industrial installation and can be used at any time to create the mold data record. The selection of the data to be used for the generation of the mold data record is done automatically and typically depends on the type of the production resource. Manual adjustments to the selection of adjustments are also possible.

Advantageous measures are also those in which additional data to mold data records are manually entered and/or selected and stored directly at a production resource, preferably the processing machine or via an external input device, in particular a computer that can be or is connected via a network. This ensures that additional information or remarks can be easily added in a simple manner, which are safely available upon a later tooling change and thus cannot be overlooked. For example, it may be of interest to have the person responsible for the release of the sampling entered, so that this person can be contacted in the event of any problems occurring after a tooling change. Design drawings of the tool, details of cold and hot runners, flow characteristics and other information can also be included. Such additional information facilitates the restart of the system after a tooling change, or error analysis, respectively.

Advantageous measures are also such in which, after a tooling change, the control device, in particular the work cell controller, or a production resource, in particular the processing machine, independently checks before start of production or start-up whether all production resources have been connected according to the associated mold data record, and the corresponding settings transmitted. This ensures that start of production or start-up is possible only after the production resources have been completely connected and the settings transferred to the production resources without errors, in accordance with the mold data record, so that generation of faulty injection-molded parts, so-called rejects, is prevented.

However, advantageous measures also include such wherein a preview and/or a target/actual comparison of the previously connected production resources with the necessary production resources is carried out by the control device, in particular the work cell controller, or the production resource, in particular the processing machine, according to the stored mold data record. This ensures that a machine setter can detect directly at the production resources, in particular at the processing machine, which production resources still need to be connected or disconnected, respectively. This gives the machine setter an immediate verification of the production resources to be correctly connected, which is not possible according to the current state of the art.

In addition, advantageous measures are those where the control device, in particular the work cell controller or the controller of the processing machine, generates a list for the work cell, in particular a work cell directory, from the mold data records. This ensures that a list of the required production resources can easily be drawn up.

However, advantageous measures are also those where the storage of the mold data records is carried out on a production resource, in particular the processing machine, or on an external storage system, preferably in a MES/ERP system. This ensures that the data are retrievable at any time from various work cells via the network.

However, advantageous measures are also those where the mold data record comprises at least one area for an injection molding machine and one or several areas for automation systems, temperature control units, flow controllers, material dryers and conveyors, metering devices, quality testing, mold data, hot runner controllers, and/or external auxiliary devices for process control, as well as special programs and other information which is automatically determined and/or manually recorded, in particular entered. This ensures that a clear digital summary is created that comprises all the data and thus prevents incorrect settings. As a result, the machine setter no longer has to deal with the details of the settings of the various production resources, as would otherwise be necessary with printed mold data sheets.

However, advantageous measures are also those where after a preceding automatic acquisition of a mold data record, upon recall of this mold data record any missing production resources are indicated at the output location, and/or a warning signal or warning light, respectively, is triggered. This ensures that start of production or start-up after a tool change is possible only if the work cell is correctly set up, so that no faulty parts can be produced nor damage occur.

Furthermore, however, the objective of the present invention is also solved by an industrial installation in which a control device, in particular a work cell controller, or a production resource, in particular a processing machine, is designed for querying and storing mold data records, wherein, in the event of a tool change, a listing of the production resources to be connected can be retrieved and read off manually or automatically at an output location.

The advantage here is that no more paper-based documents, in particular mold data sheets, are needed, which often lead to mix-ups or data being overlooked or misread, respectively. A major advantage of the solution according to the present invention is that a wide variety of control and testing mechanisms can be used, which detect incorrectly connected and adjusted production resources and prevent start-up of the industrial installation.

The invention is further explained by means of several exemplary embodiments shown in the drawings, wherein, however, the invention is not limited to the exemplary embodiment shown and described.

It should be stated by way of introduction that, in the individual embodiments, identical parts are provided with the same reference numbers or same component designations, respectively, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

Figure 1:
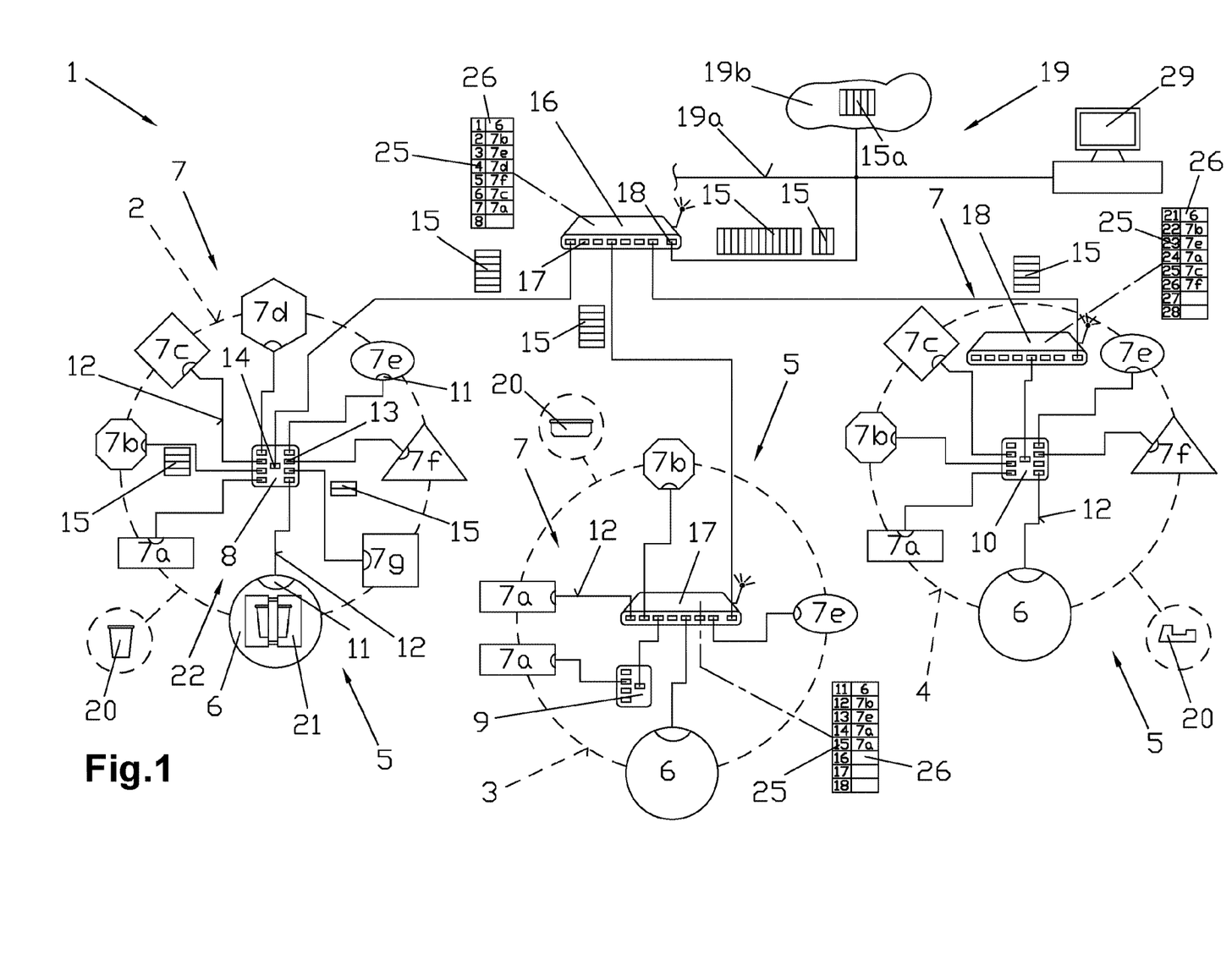
FIG. 1—an overview illustration of a plastics-processing industrial installation, simplified, for illustrative purposes only.
Figure 2:
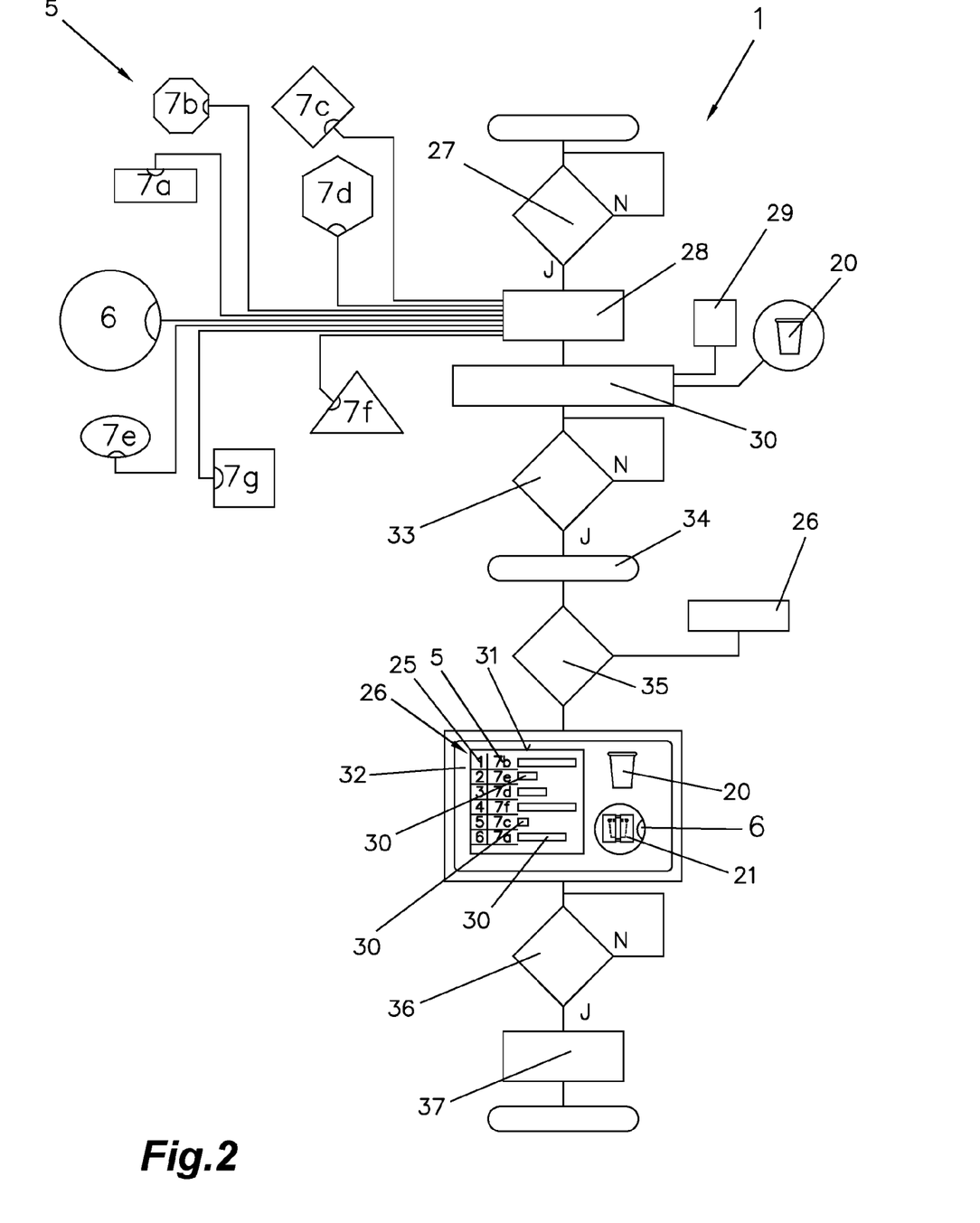
FIG. 2—a flow chart for the industrial installation according to FIG. 1, simplified, for illustrative purposes only.
Figure 3:
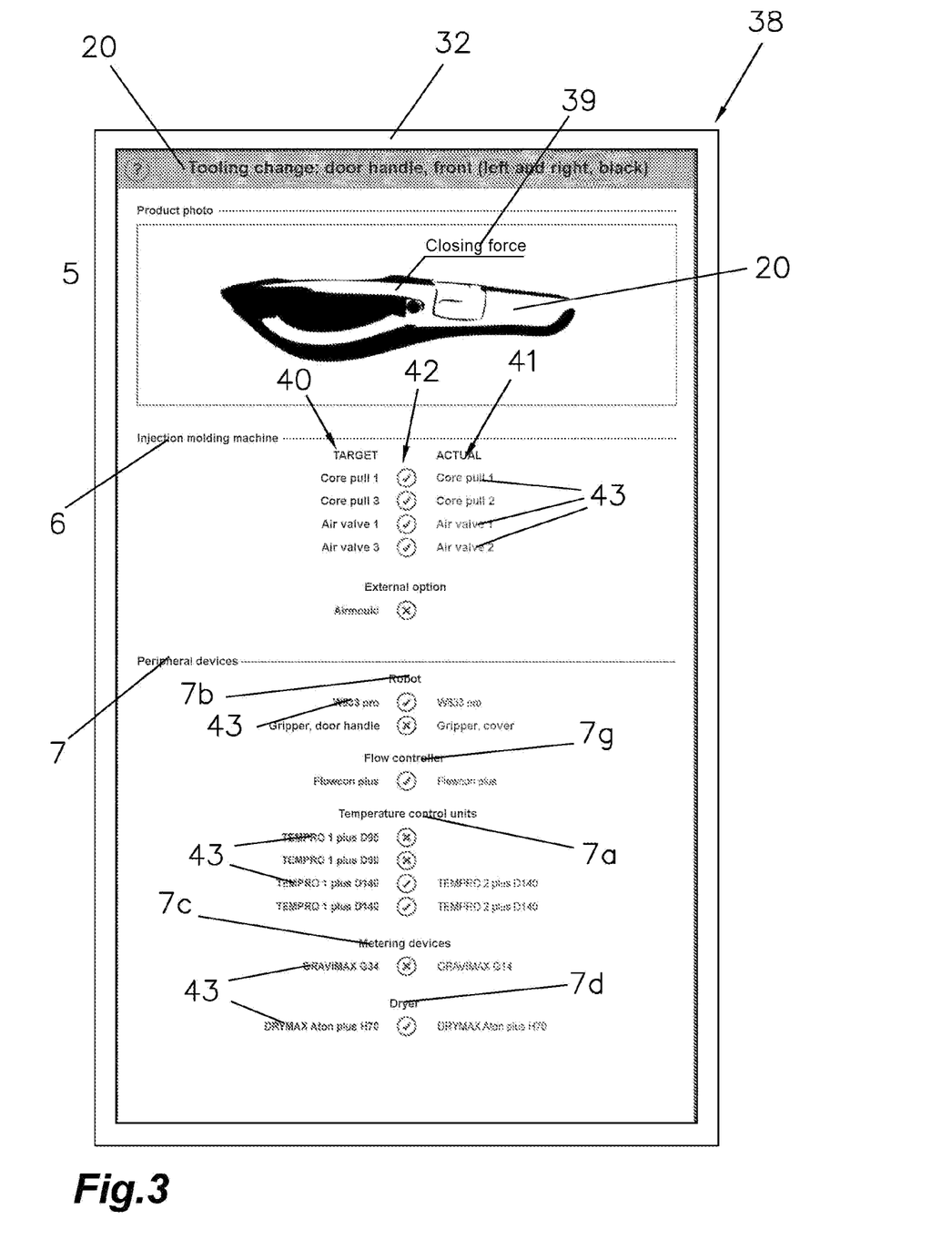
FIG. 3—a display indication on the processing device, simplified, for illustrative purposes only.

As a matter of principle, it should be mentioned with regard to the exemplary embodiments in FIGS. 1 to 3 that the use is preferably in a plastics-processing industry 1 or industrial installations 1, respectively.

FIGS. 1 to 3 show the industrial installation 1 with one or several work cells 2 to 4, wherein certain production resources 5, shown in simplified form, are organized into work cells 2 to 4. The production resources 5 preferably consist of at least one processing machine 6 of the plastics-processing industry 1, in particular an injection molding machine 6, and at least one peripheral device 7. The peripheral devices 7 can, for example, consist of a temperature control unit 7a, a robot or extraction robot 7b, respectively, a metering device 7c for granulate, a granule dryer 7d, a granulate conveyor 7e, a camera system 7f for quality control, an automatic flow controller 7g etc., as shown schematically.

In the exemplary embodiment illustrated in FIG. 1, the production resources 5 in a work cell 2 to 4 are connected to a means of communication 8 to 10, in particular a switch 8 to 10, i.e. each processing device 6 and peripheral device 7 is preferably equipped with a communication and/or detection module 11 implemented in hardware or software for better detection. The production resources 5 are connected via a line, in particular a commercially available interface cable 12, with one input/output port 13 each, to the means of communication 8 to 10, wherein wireless connection, for example via WLAN, is also possible. The means of communication 8 to 10 is connected via a communication input/output port 14 for sending data packets 15 or data records 15, respectively, as shown schematically, to a superordinate work cell controller 16 to 18. However, it is also possible that no means of communication 8 to 10 is used and the processing device 6 and the peripheral devices 7 are connected directly to a work cell controller 16 to 18 as shown inter alia in work cell 3 as well. It is also possible that several such means of communication 8 to 10 are arranged in a work cell 2 to 4. For the sake of completeness, it is pointed out that the individual work cells 2 to 4 are or can be, respectively, equipped differently, i.e. each work cell 2 to 4 has a different number and/or type of production resources 5. Preferably, one work cell controller 16 to 18 is designed as a superordinate work cell controller 16 to 18, in our case the work cell controller 16, which carries out a data exchange via the communication input and/or output port 14 to a superordinate point, a network 19, preferably an internal company intranet 19a and/or a superordinate external network 19, in particular an internet 19b.

In such an industrial installation 1, each work cell 2 to 4 operates independently of the other work cells 2 to 4, i.e. each work cell 2 to 4 always contains those production resources 5 required for the manufacture of a specific product, in particular an injection-molded part 20. For example, in the industrial installation 1 shown here, a tool or mold 21, which is preferably formed by two or alternatively several opening tool molds for injecting a plastic material, could be inserted in the work cell 2 to produce the injection-molded item or injection-molded part 20, respectively, for example in the form of a cover in the interior of an automobile in a high-gloss finish or beverage cups, etc., which requires a temperature control unit 7a for temperature control, a robot 7b for gentle extraction, a metering device 7c for the correct composition of the plastic granules to be processed, a dryer 7d for drying the plastic granules, a conveyor 7e for conveying the granules to the plasticizing and injection unit of the processing machine, a camera system 7f for checking the finished product and a flow controller 7g for automatic flow control through the mold.

It can thus be said that the industrial installation 1 is designed to carry out the management and control of the production resources 5 with one or several work cells 2 to 4, whereby the production resources 5 are organized in the work cells 2 to 4, each of which is formed by preferably at least one processing machine 6 of the plastics-processing industry 1 and at least one peripheral device 7, which are connected to one another by a network of production resources 22. The production resources 5 are connected to the work cell controller 16 to 18, whereby the production resources 5 are automatically detected by the work cell controller 16 to 18 or the corresponding processing machine 6 of work cell 2 to 4, whereupon the work cell controller 16 to 18 or the processing machine 6 of work cell 2 to 4 performs on the one hand the communication or the data exchange 15, respectively, with the preferably network 19, in particular an intranet 19a and/or an internet 19b, and on the other hand with the production resources 5 of the work cells 2 to 4, in particular via the production resources network 22, and establishes direct communication among the production resources 5. Upon connection of a production resource 5 to the work cell controller 16 to 18 or to the corresponding processing machine 6, these are automatically detected, and the production resources 5 are assigned an address 25 by the work cell controller 16 to 18 or the processing machine 6, whereby the work cell controller 16 to 18 or processing machine 6 automatically creates a list 26 or a work cell directory 26, respectively, of the production resources 5 and functions present in work cells 2 to 4. This creates a so-called "Plug and Produce", in which now merely the devices, i.e. the production resources 5, are connected, preferably via a single line 12, whereupon all further steps are carried out automatically.

Depending on the plastic material to be processed, the number and arrangement of the cavities in the injection mold 21, the formation of cold runners in the respective cavities, the arrangement and design of cores and sliders, orientation and number of injection points, and the requirements for surface finish and other qualitative characteristics, each injection-molded part 20 requires, in addition to the machine-internal process parameters for plasticizing, melt entry and mold closure, the use of differing production resources 5 for mold temperature control, cooling, material drying and metering, as well as material conveyance, in order to obtain the desired injection-molded part 20 in the required quality In this process, an injection-molded part 20 typically undergoes a sampling process before release for series production, in which the machine-internal process parameters and the necessary production resources 5 are determined with the respective settings, whereby in the state of the art this is entered manually on paper in worksheets or mold data sheets, respectively, i.e., the compilation of production resources 5 required for the respective injection molding process is currently recorded manually on paper in a mold data sheet, whereby the associated settings defined in the sampling process are either stored locally in the respective controller of the production resources 5 or noted on this mold data sheet, so that this mold data sheet, typically in the form of a printed sheet, serves the machine setter upon a tooling change of the tool 21 as a guide for correct assembly of a work cell 2 to 4, in particular an injection molding work cell 2 to 4, with the necessary production resources 5, and the associated settings. Since an injection molding work cell 2 to 4 consists of several production resources 5 of different design and characteristics, incorrect combination of work cells 2 to 4, or entry of incorrect process parameters, respectively, is a frequent problem and a cause for the generation of rejects or parts with hidden defects, respectively. In some cases, this has already led to recalls of goods that had installed such a defective injection-molded part 20.

According to the present invention, it is now envisioned that the machine setter is enabled, preferably on the processing machine 6, in particular a plastic injection molding machine, or a work cell controller with output unit, to perform the preview and/or the target/actual comparison, as shown schematically in FIG. 2 or 3, of the production resources 5 which would be necessary for a new tool 21 to be clamped or already placed in the machine. This is achieved in such a way that after a manual storage request 27, according to the flow chart in FIG. 2, at a control device, in particular a work cell controller 16 to 18, or at a production resource 5, in particular a processing machine 6, all connected production resources 5 are queried (query module 28), and data defined, such as the respective settings, as well as program sequences, formulations and other configurations, can be read out from these and, together with the internal settings 29, in particular with those of the processing machine 6, combined to form a mold data record 30 for this injection-molded part 20, whereby a listing 31 of the necessary production resources 5 for the injection-molded part 20 that can be produced on this processing machine 6 can be automatically generated at any time from the mold data record 30 and displayed at an output location 32, preferably a display of the processing machine 6, as shown schematically in FIG. 2.

This process or method, respectively, according to the present invention allows on the one hand complete elimination of the mold data sheet on paper previously required in accordance with the state of the art, and on the other hand ensures the correct connection of the necessary production resources 5 for the respective tool 21, in particular because, due to the procedure, specially adapted control mechanisms can be used in addition to the displayed mold data records in order to avoid incorrect connections and settings. A mix-up of the mold data sheet 30 for the processing machine 6, as is easily possible with the state of the art, can thus be completely ruled out, as the mold data record(s) 30 generated is/are stored directly on the corresponding production resources 5, in particular the processing machines 6, so that the machine setter does not have to make any selection, but can simply call up these mold data records 30 for this one work cell 2 to 4 and thus no mix-ups can occur. The generated mold data record 30 can be stored in the system, in particular in the memories of the processing machine 6 or on an external storage system, preferably in a MES/ERP system (not shown), so as to be retrievable at any time.

If a manual tooling change 33 is initiated, a so-called display mode 34 or tooling change mode 34 is started or called up, respectively, in which a listing 31 of the necessary production resources 5 is generated from the mold data record 30. For example, it is possible that in a combination module 35, the mold data record(s) 30 can be linked with the list 26 or the work cell directory 26, respectively, wherein this module 35 can also be omitted.

Then the listing 31 generated from this is displayed at the output location 32 which can be set for this purpose, which in the exemplary embodiment shown is the display of the processing unit 6. It is of course possible that the listing 31 is created and saved already after the manually initiated storage request 27, so that when the tool change 33 is manually requested, the finished listing 31 is now merely displayed.

At the output location 32, there is preferably a wide variety of data for the machine setter, such as the listing 31, consisting of the associated production resources 5 and the associated process settings, formulations, workflow programs for the injection-molded part 20, a symbolic image of the injection-molded part 20 and a symbolic image of the mold 21, whereby the symbolic images can be provided with corresponding notes, links, etc., via which further detailed data are retrievable. For this purpose, the output location 32 can preferably be formed by a touch screen, so that the machine setter is provided with further data by simply touching the symbols, links and/or lists. It is also possible that indicator lamps (not shown) with multiple colors, in particular red for a missing production resource 5 and green for a correctly connected and detected production resource 5, are assigned to the generated listing 31, so that the machine setter can easily detect which production resource 5 is already connected and which is still missing. For example, still further colors of the control lamps can also be used for further information, such as yellow control lamp for production resource 5 present, but mold data record 30 faulty or not yet transferred, respectively, etc.

The machine setter can previously or subsequently disconnect the individual production resources 5, which must be disconnected for a tooling change 33 of tool 21, and replace tool 21 with a new or overhauled tool 21. For start-up, the machine setter can now correctly connect work cells 2 to 4, in particular the individual production resources 5, on the basis of the information shown at starting point 32. Preferably, however, after a tool change 33, the control device, in particular the work cell controller 16 to 18, or a production resource 5, in particular the processing machine 6, checks independently, for example via a test mode 36, before or during start-up whether all production resources 5 have been connected according to the associated mold data record 30 and the corresponding settings made.

Before or during the inspection or alternatively by manual triggering of the tool change 33, it is possible that during or after the tool change 33 on the processing machine 6, the associated mold data record 30 is transmitted to the processing machine 6 via an external MES or ERP system or is taken from the internal tool catalog 29 or settings 29 of the processing machine 6, respectively, and the mold data record 30 is automatically distributed to the corresponding components of the connected and necessary production resources 5 and transferred to the same. As a result, the machine setter now merely needs to connect the production resources 5 via the interface cable 12, so that this is detected by the work cell controller 16 to 18 and the associated mold data record 30 is then transmitted to the production resources 5. However, it is also possible that after detection of the connection of a production resource 5, first the newly detected production resource 5 is queried for already installed or set data or mold data records 30, respectively, and subsequently only the missing data are added and/or transferred. If all production resources 5 have been correctly detected and set, this is indicated via a release module 37, whereupon, preferably by manual input, the industrial installation 1 is released for production of the injection-molded part 20, and the tooling change is completed.

In addition to the machine-internal process parameters of the processing machine 6 for e.g. plasticizing, melt entry and mold closure, the respective settings, parameters, identifiers of the different production resources 5 for mold temperature control, cooling, material drying, metering and conveying, as well as workflow programs for automatic demolding of the respective injection-molded part by robots, gripper identifiers, as well as parameters for external process aids and other part-specific data can be stored as mold data records. The mold data record has at least one area for a processing device 6, in particular an injection molding machine, and one or several areas for automation systems, temperature control units, flow controllers, material dryers and conveyors, metering devices, quality testing, mold data, hot runner controllers, and/or external auxiliary devices for process control, as well as special programs and other information which is automatically determined and/or manually recorded, in particular entered.

Furthermore, it is possible that the display of the production resources 5 connected to the injection molding machine 6, as well as the production resources 5 required for the tool 21, is preferably displayed on the operating unit of the injection molding machine or another central point in the work cell 2 to 4. In particular, it is possible that after previous automatic acquisition of a mold data record 30, upon recall of this mold data record 30, missing production resources 5 are displayed at the output location 32 and/or a warning signal or warning light, respectively, is triggered.

FIG. 3 shows a schematically simplified display indication of the output location 32 on a processing unit 6, from which a target/actual comparison 37 is shown. Here, the display has various areas, but these can be arranged as desired, and only one embodiment was shown as an example.

In the upper area, here the name of the injection-molded part 20 for the tooling change is given, followed by a representation of the injection molding part 20 to be produced. It is possible that the display of the injection-molded part 20 is stored with various additional functions 39 and links 39, for example for storing the clamping force (as shown) etc., which can be called up at any time by activating. The additional functions 39 and links 39 can also be implemented as menu items.

Then the individual production resources 5 are listed, whereby preferably the target state is shown on the left 40 and the actual state on the right 41. Between the areas there is a control lamp 42, which indicates whether the corresponding listed link or items 43 are present or not. Here, the detection of the connections behind the links 43 or items 43 is carried out with a check mark for everything OK—connection and thus production resources available, whereas a cross is displayed for no connection found or wrong connection. This can also be additionally highlighted in green and red.

In the exemplary embodiment shown, the areas for a processing unit 6, in particular an injection molding machine, the peripheral units 7, in particular a robot 7b, a flow controller 7g, a temperature control unit 7a, a metering device 7c and a dryer 7d, are shown, which have corresponding links 43 or production resources 43.

In the target/actual comparison 38, the names of the necessary connections or production resources 43 for the production of the injection-molded part 20, i.e. when generating the mold data record 30, are shown on the left 40, whereby the names of the detected devices are displayed on the right 41. If an incorrect connection is detected here, this is marked with a cross so that the machine setter can detect this and immediately pinpoint the error due to the mismatched names.

As a matter of principle, it should be mentioned that the application of the mold data record 30 can be applied even to systems that are not designed as work cells. It is also possible to call up the tool change 33 at any time, so that in the flow chart according to FIG. 2, query 27, in particular the "no" path, can be optionally connected with query 33 for tool change 33.

It is pointed out that the invention is not limited to the embodiments shown, but may comprise further embodiments.

The invention claimed is:

1. A method for viewing and selecting production resources for the injection molding industry, which are organized in at least one work cell for producing an injection-molded part and are connected to one another via a network, wherein at least one of the production resources is designed as a processing machine, the method comprising:
    following a manual storage request on a work cell controller or on the processing machine, all connected production resources are queried and defined data are read out from the queried connected production resources and are combined with internal settings of the processing machine, in a manner depending on an injection-molded part being produced to form a mold data record that is stored in one or several mold data records, whereby a listing of the production resources required for the production of the injection-molded part is automatically generated at any time from the mold data record or records and displayed at an output point, and whereby the defined data associated with the respective production of the injection molded part are further transmitted to the production resources.

2. The method according to claim 1, wherein after performance of a tool change on the processing machine, the associated mold data record is transmitted to the processing machine via an external manufacturing execution system (MES) or enterprise resource planning (ERP) system or is taken from the internal tool catalog or settings of the processing machine, respectively, and the mold data record or records is automatically assigned to the corresponding components of the connected and necessary production resources and transferred to the same.

3. The method according to claim 1, further comprising storing:
    machine-internal process parameters of the processing machine for plasticizing, melt entry, and mold closure,
    respective settings, parameters, and identifiers of various production resources for mold temperature control, cooling, material drying, metering and conveying,
    workflow programs for automatic demolding of the injection-molded part by robots, gripper identifiers, and
    parameters for external process aids and other part-specific data.

4. The method according to claim 1, wherein additional data or mold data records, respectively, for one tool each are manually entered and/or selected and stored directly on a production resource that is linkable or linked via a network.

5. The method according to claim 4, wherein the production resource on which the additional data or mold data records are stored in the processing machine or in an external input device or a computer.

6. The method according to claim 1, wherein after a tooling change the production resources are checked independently by the work cell controller or the processing machine, before start-up, to confirm that all production resources have been connected according to the associated mold data record or records and the corresponding settings have been made.

7. The method according to claim 1, wherein a preview and/or a target/actual comparison of the newly connected and set-up production resources with the necessary production resources is carried out by the the work cell controller or the processing machine, according to the stored mold data record or records.

8. The method according to claim 1, wherein a list for a work cell directory is generated from the mold data record or records by a work cell controller or a controller of the processing machine.

9. The method according to claim 1, wherein the mold data record or records are stored on the processing machine or on a manufacturing execution system (MES) enterprise resource planning (ERP) system.

10. The method according to claim 1, wherein the mold data record or records comprises at least one area for entering an injection molding machine and one or several areas for entering automation systems, temperature control units, flow controllers, material dryers and conveyors, metering devices, quality testing, mold data, hot runner controllers, and/or external auxiliary devices for process control, and for entering special programs and other information which is automatically determined and/or manually recorded.

11. The method according to claim 1, wherein after a preceding automatic acquisition of a mold data record or records, upon recall of this mold data record missing production resources are indicated at the output location, and/or a warning signal or warning light, respectively, is triggered.

12. An industrial installation or production system, respectively, for carrying out the method according to claim 1, comprising:
the at least one work cell;
production resources, which are a part of the at least one work cell,
wherein the production resources are composed of the at least one processing machine and at least one peripheral device and the work cell controller is designed for communication with the network and with the production resources of the at least one work cell,
wherein the work cell controller or the processing machine is designed for querying and storing mold data records, and
wherein one or several of the mold data records for producing the injection molded part and a listing of the production resources to be connected for producing the injection molded part are retrievable and readable manually or automatically at an output point.

13. The method according to claim 1, wherein the defined data read out from the queried connected production resources comprises respective settings, program sequences, formulations and other configurations.

* * * * *